(12) United States Patent
Kim et al.

(10) Patent No.: US 9,032,457 B2
(45) Date of Patent: May 12, 2015

(54) STREAMING DATA PROCESSING METHOD AND APPARATUS FOR DIGITAL BROADCAST SYSTEM SUPPORTING VOD SERVICE

(75) Inventors: Sang Gyu Kim, Suwon-si (KR); Jung In Jang, Yongin-si (KR); Hun Soo Jee, Seongnam-si (KR); Bon Seuk Goo, Suwon-si (KR); Kyu Sung Choi, Suwon-si (KR); Won Chang Joe, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 12/911,104

(22) Filed: Oct. 25, 2010

(65) Prior Publication Data

US 2011/0099593 A1 Apr. 28, 2011

(30) Foreign Application Priority Data

Oct. 23, 2009 (KR) ........................ 10-2009-0101200

(51) Int. Cl.
| | | |
|---|---|---|
| H04N 7/173 | (2011.01) | |
| H04N 21/433 | (2011.01) | |
| H04N 21/4335 | (2011.01) | |
| H04N 21/443 | (2011.01) | |
| H04N 21/472 | (2011.01) | |
| H04N 21/6377 | (2011.01) | |
| H04N 21/658 | (2011.01) | |

(52) U.S. Cl.
CPC ....... *H04N 7/17318* (2013.01); *H04N 21/4334* (2013.01); *H04N 21/4335* (2013.01); *H04N 21/4435* (2013.01); *H04N 21/47202* (2013.01); *H04N 21/6377* (2013.01); *H04N 21/658* (2013.01); *H04N 21/6581* (2013.01)

(58) Field of Classification Search
USPC ...................................... 725/87–93
See application file for complete search history.

(56) References Cited

U.S. PATENT DOCUMENTS

| | | | | |
|---|---|---|---|---|
| 7,581,019 | B1 * | 8/2009 | Amir et al. ..................... | 709/235 |
| 7,751,628 | B1 * | 7/2010 | Reisman ....................... | 382/232 |
| 8,046,486 | B2 * | 10/2011 | Amir et al. ..................... | 709/235 |
| 2006/0218607 | A1 * | 9/2006 | Hodzic et al. .................. | 725/100 |
| 2008/0134258 | A1 * | 6/2008 | Goose et al. .................... | 725/91 |
| 2009/0019489 | A1 * | 1/2009 | Ohlfs et al. ..................... | 725/44 |

\* cited by examiner

*Primary Examiner* — Pankaj Kumar
*Assistant Examiner* — Charles N Hicks
(74) *Attorney, Agent, or Firm* — Jefferson IP Law, LLP

(57) ABSTRACT

A method and apparatus for processing streaming data of content in a digital broadcast system supporting Video On Demand (VOD) service are provided. A data processing method of a set-top box supporting Video On Demand (VOD) service includes requesting content selected by a user, configuring, if streaming data of the content is received, file block information for storing the streaming data, and storing the streaming data in units of file blocks according to the file block information. The streaming data processing method and apparatus of the present invention are capable of processing the streaming data of the content of which size is larger than the available storage space efficiently. Also, the streaming data processing method and apparatus of the present invention is capable of reducing total manufacturing cost of the set-top box by reducing costly storage device in size.

13 Claims, 8 Drawing Sheets

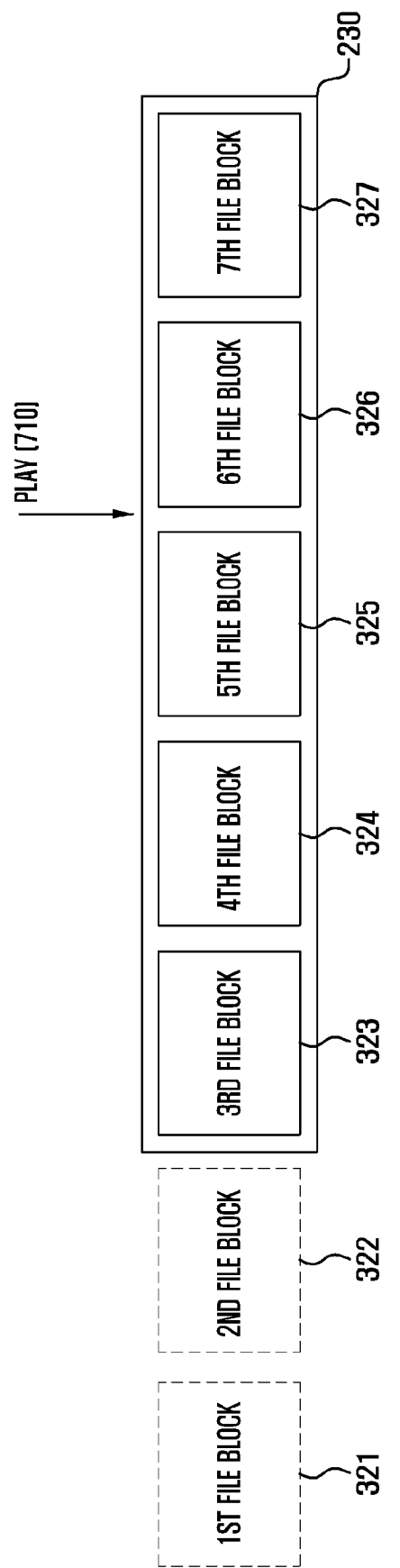

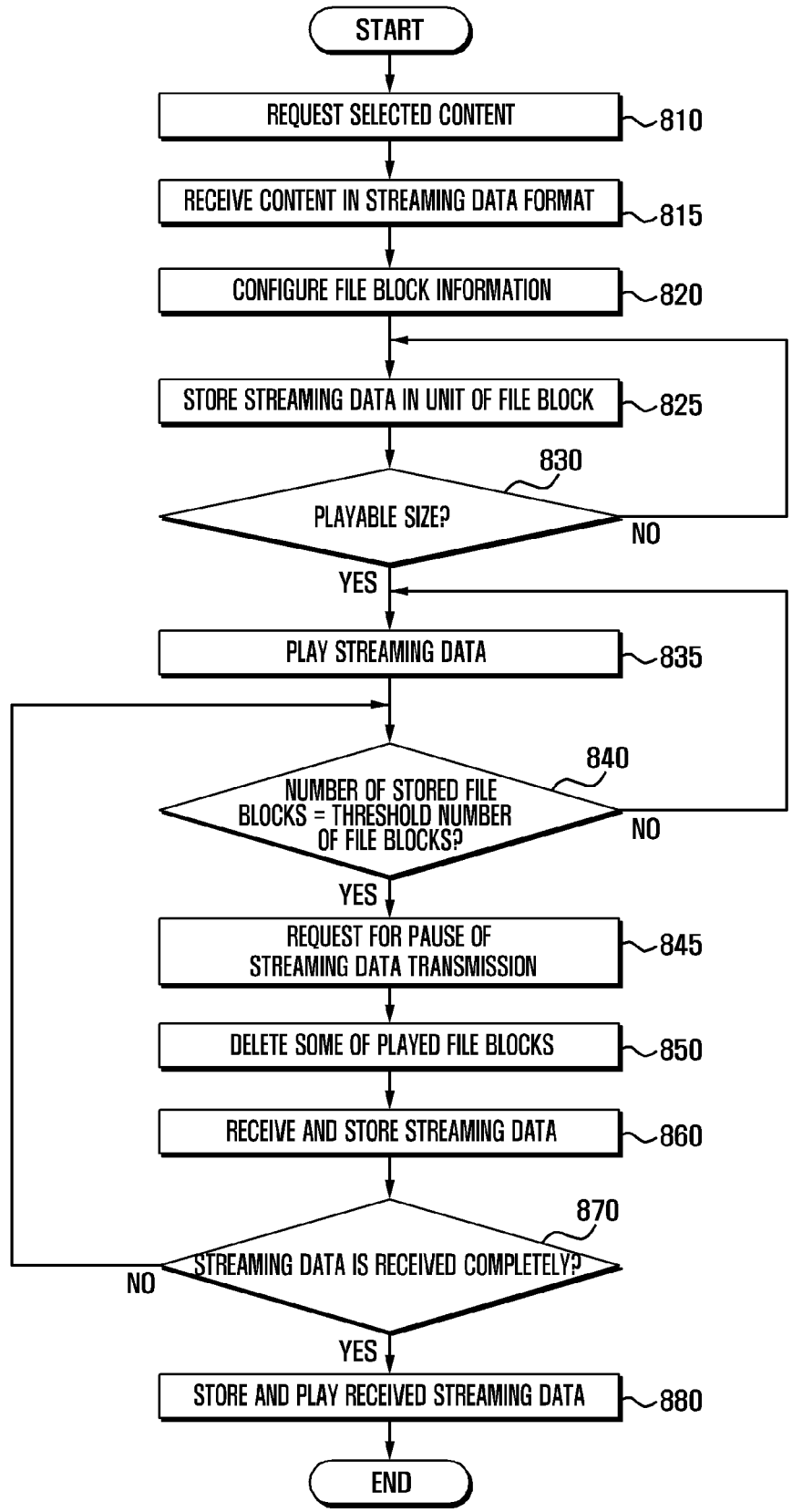

STREAMING DATA PROCESSING METHOD AND APPARATUS FOR DIGITAL BROADCAST SYSTEM SUPPORTING VOD SERVICE

PRIORITY

This application claims the benefit under 35 U.S.C. §119 (a) of a Korean patent application filed on Oct. 23, 2009 in the Korean Intellectual Property Office and assigned Serial No. 10-2009-0101200, the entire disclosure of which is hereby incorporated by reference.

BACKGROUND OF THE INVENTION

1. Field of the Invention

The present invention relates to a digital broadcast system. More particularly, the present invention relates to a method and apparatus for processing streaming data of content in a digital broadcast system supporting Video On Demand (VOD) service.

2. Description of the Related Art

Video On Demand (VOD) is a service that allows users to select and watch/listen to video or audio content on demand. Unlike a unidirectional broadcast service provided by a terrestrial broadcast or cable broadcast system, the VOD service is a bidirectional service that provides the subscriber with the content selected by the subscriber at the time selected by the subscriber.

A digital broadcast system supporting VOD service includes a content server, at least one set-top box, a network, and at least one content player. The content server stores VOD contents and transmits the content requested by a subscriber to the set-top box of the subscriber. The set-top box is responsible for recovering and playing the content transmitted in compressed form and for sending the subscriber's request to the content server. The network interconnects the content server and the set-top box. The content player plays the content data supplied by the set-top box.

The set-top box provides various functions for playing the content downloaded from the content server. The set-top box executes commands such as play, pause, fast forward, fast reverse, and skip that are input by means of a remote control or keys provided on a User Interface of a terminal.

The set-top box can be configured to provide the VOD service in various content playback schemes. For example, the set-top box can be configured to provide a VOD service in which the content is received in streaming data format and played immediately. The set-top box also can be configured to provide a VOD service in which the content received in streaming data format is stored and then the stored content is played at a later time.

In case of the store-and-play VOD service, the set-top box stores the received content in a storage device having a large storage capacity such as an internal or external hard disk. Typically, the hard disk has a storage space large enough to store the received content such that the set-top box stores the entire data of content and then provides the VOD service.

While there is no problem when the data size of the entire content downloaded from the content server is less than the storage capacity of the storage device, there is a problem when the data size of downloaded content is greater than the storage capacity. This causes a storage space shortage problem, resulting in failure of VOD service.

SUMMARY OF THE INVENTION

An aspect of the present invention is to address at least the above-mentioned problems and/or disadvantages and to provide at least the advantages described below. Accordingly, an aspect of the present invention is to provide a data processing method and apparatus for a digital broadcast system supporting VOD service that is capable of avoiding storage space shortage.

In accordance with an aspect of the present invention, a data processing method of a set-top box supporting Video On Demand (VOD) service is provided. The method includes requesting content selected by a user, configuring, if streaming data of the content is received, file block information for storing the streaming data, and storing the streaming data in unit of file block according to the file block information.

In accordance with another aspect of the present invention, a data processing method of a set-top box having limited storage space is provided. The method includes configuring, if streaming data of content is received from a content server, file block information for storing the streaming data, storing the streaming data according to the file block information, determining whether a number of files corresponding to the received streaming data is equal to a threshold number of storable file blocks which is set in the file block information, requesting, if the number of files corresponding to the received streaming data is equal to the threshold number of storable file blocks, the content server to pause the transmission of the streaming data, deleting a predetermined number of file blocks according to the file block information, requesting the content server to resume transmission of the streaming file, and storing the streaming data transmitted by the content server in units of file blocks.

In accordance with still another aspect of the present invention, a data processing apparatus is provided. The apparatus includes a communication unit for receiving streaming data of content transmitted by a content server, a storage unit for storing the streaming data in unit of file block, and a file block configuration unit for configuring file block information for storing the streaming data, for determining whether a number of file blocks of the received streaming data is equal to a storable number of file blocks which is set in file block information while playing the streaming data, and for deleting a predetermined number of file blocks according to the file block information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 7 is a diagram illustrating a file block deletion operation as a consequence of a playback skip operation in a set-top box according to an exemplary embodiment of the present invention; and FIG. 8 is a flowchart illustrating a method for processing streaming data of multimedia content according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'content' denotes information or data such as text, symbol, voice, sound, image, and video that are digitally produced. More particularly, content is digital data represented by the program produced by a broadcast station or cable network operator and provided to a subscriber through a content server. The content server transmits the content to a set-top box in a streaming data format. The set-top box receives the streaming data and decodes the streaming data into the original content. The content decoded by the set-top box is provided to a user terminal connected through a wired or a wireless channel such that the user terminal plays the received content.

Figure 1:
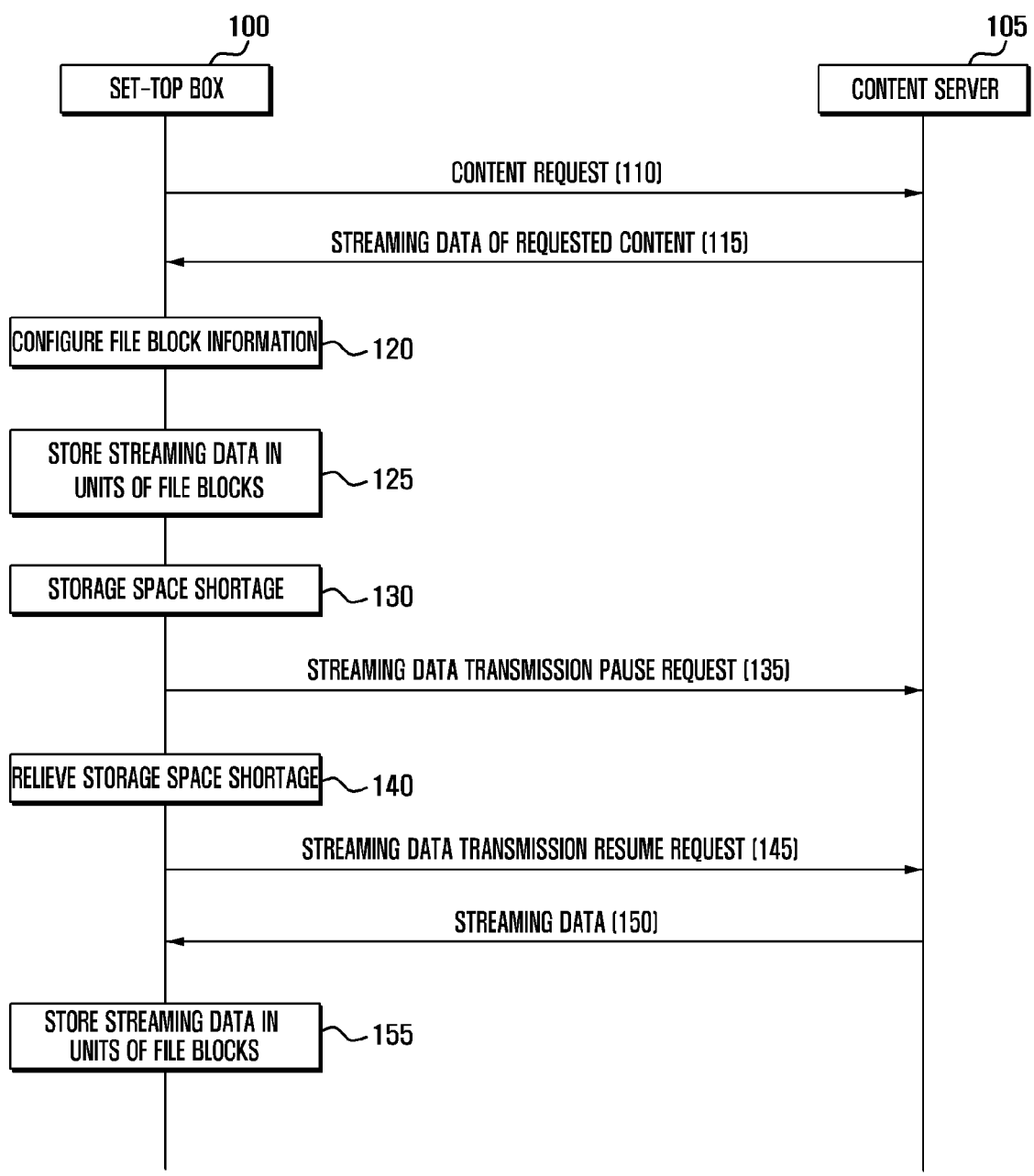
FIG. 1 is a signaling diagram illustrating a content processing method for a digital broadcast system according to an exemplary embodiment of the present invention.

FIG. 1 is a signaling diagram illustrating a content processing method for a digital broadcast system according to an exemplary embodiment of the present invention.

Referring to FIG. 1, the set-top box 100 sends a content request to the content server 105 in step 110. Upon receipt of the content request, the content server 105 transmits the requested content to the set-top box in streaming data format in step 115. The set-top box 100 generates file block information for storing the streaming data in units of file blocks in step 120. The file block information includes a number of file blocks constituting the content, a file block size, a number of file blocks before and after the ongoing file block during the playback of the content, and the like. More particularly, the number of file blocks can be set in consideration of the entire size of the content and the storage capacity of the storage unit of the set-top box.

After generating the file block information, the set-top box 100 stores the streaming data in units of file blocks sequentially in step 125. The set-top box 100 monitors the size of the streaming data accumulated in the file blocks and, if the accumulated streaming data reaches a threshold size, decodes the streaming data accumulated in the corresponding file block to play the content.

At this time, the set-top box 100 determines an amount of storage space available in a storage unit. That is, the set-top box 100 determines whether the number of file blocks stored in the storage unit is equal to a threshold number of file blocks. If the number of stored file blocks is equal to the threshold number of file blocks, the set-top box 100 regards this as a shortage of storage space in step 130. If the storage space shortage is detected, the set-top box 100 sends a streaming data transmission pause request to the content server 105 in step 135. Although not depicted in the drawing, the content server 105 pauses transmission of the streaming data upon receipt of the streaming data transmission pause request.

If the storage space shortage is relieved by removing the played file blocks in step 140, the set-top box 100 sends a streaming data transmission resume request to the content server 105 in step 145. At this time, the streaming data transmission resume request is transmitted along with the information on the last file block stored before the pause of the streaming data transmission. The last stored file block information includes the playback time of the corresponding streaming data and the size of the received streaming data relative to the size of the entire data of the content.

If the streaming data transmission resume request is received, the content server 105 resumes transmission of the streaming data from the next file block after the last received file block in step 150. At this time, the content server 105 checks the lastly stored file block information transmitted by the set-top box and recognizes the file block to be transmitted first. The set-top box 100 stores the streaming data transmitted by the content server 105 in units of file blocks again in step 155. This procedure is repeated until the entire content is downloaded completely.

A description is made below of a configuration of an exemplary set-top box for storing streaming data of content in units of file blocks with reference to FIG. 2.

Figure 2:
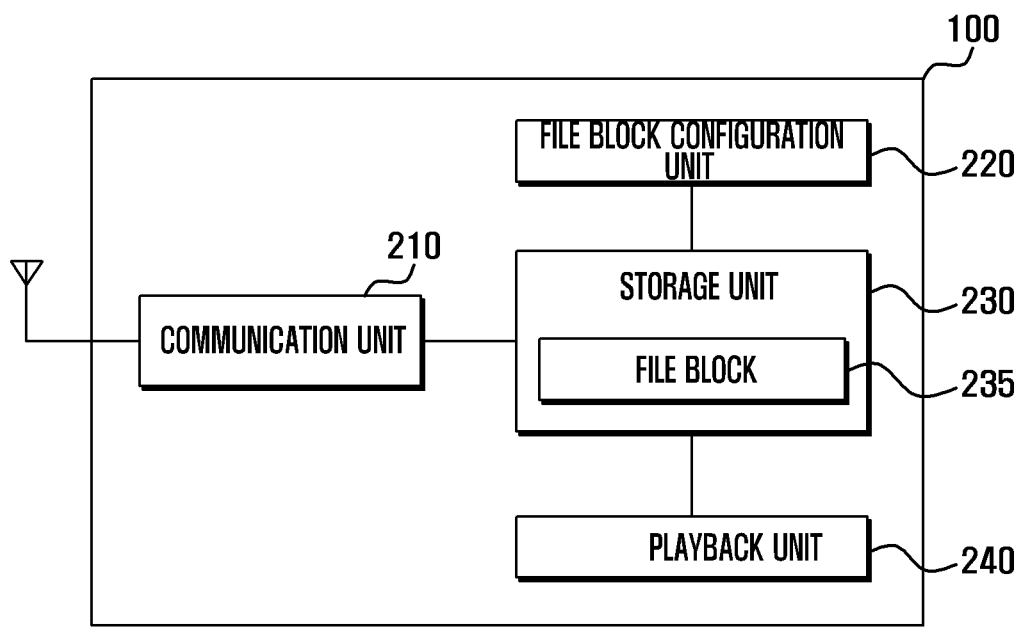
FIG. 2 is a block diagram illustrating a configuration of a set-top box for a digital broadcast system according to an exemplary embodiment of the present invention.

FIG. 2 is a block diagram illustrating a configuration of a set-top box for a digital broadcast system according to an exemplary embodiment of the present invention.

Referring to FIG. 2, the set-top box 100 includes a communication unit 210, a file block configuration unit 220, a storage unit 230, and a playback unit 240.

The communication unit 210 is responsible for receiving the streaming data of contents provided by the content server 105. The communication unit 210 transmits VOD control command and information to the content server 105 in response to a user input. The communication unit 210 also can transmit a streaming data transmission pause request to the content server 105. The communication unit 210 also can transmit a streaming data transmission resume request to the content server 105.

The file block configuration unit 220 is responsible for generating file block information related to the storage of the streaming data received through the communication unit 210. In more detail, the file block configuration unit 220 can configure a number of file blocks, size of a file block, number of file blocks to be stored before and after the ongoing file block, and a number of file blocks to be deleted among the stored file blocks according to a preset rule. The file block configuration unit 220 can configure the file block information in consideration of the total storage capacity of the storage unit 230 and the amount of empty storage space. The total amount of streaming data of the content can be determined by referencing the content information included in the header of streaming data transmitted by the content server.

In case that the number of file blocks stored in the storage unit 230 becomes equal to a threshold value, the file block configuration unit 220 can transmit the streaming data transmission pause request to the content server 105 by means of the communication unit 210. In case that the number of file blocks stored in the storage unit 230 becomes less than the threshold value due to the playback or deletion of some file blocks, the file block configuration unit 220 can transmit the streaming data transmission resume request to the content server 105.

The storage unit 230 can store the streaming data received by communication unit 210 in units of file blocks 235 according to the preset file block information. While playing the content, the streaming data are stored into the file block 235 in sequential order. The streaming data are provided with position values for playback order and thus stored in ascending order based on the position values. The storage 230 can be configured to delete a threshold number of file blocks that are played already under the control of the file block configuration unit 220.

The playback unit 240 transfers the streaming data stored in units of file blocks to a decoder (not shown) such that the decoder decodes the streaming data into the content to be played.

A description is made below of an exemplary method for storing streaming data of content in units of file blocks within a set-top box.

Figure 3:
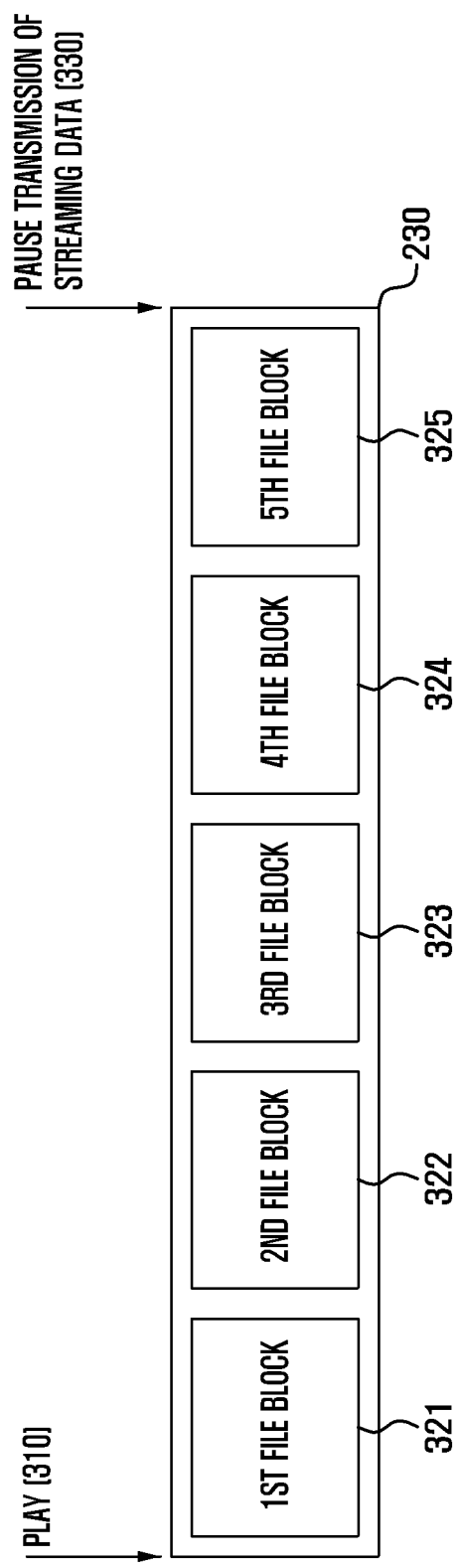
FIG. 3 is a diagram illustrating a format of streaming data stored in a set-top box according to an exemplary embodiment of the present invention.

FIG. 3 is a diagram illustrating a format of streaming data stored in a set-top box according to an exemplary embodiment of the present invention.

Referring to FIG. 3, the number of file blocks which the storage unit 230 can store is 5. Of course, the number 5 is used as an example only and not intended to limit the invention. The storage capacity of a file block can vary according to the total size of the content.

In the exemplary embodiment of FIG. 3, the set-top box 100 supporting VOD service stores a part of the streaming data of the content into five file blocks in playback order. If a playback command is input at a time as denoted by reference number 310, the set-top box 100 plays the streaming data stored in the first file block 321, the second file block 322, the third file block 323, the fourth file block 324, and the fifth file block 325 in sequential order. If all of the five file blocks are stored completely, the set-top box 100 requests the content server 105 to pause the transmission of the streaming data at a time as denoted by reference number 330. The set-top box 100 can delete the file block that has been played already.

Figure 4:
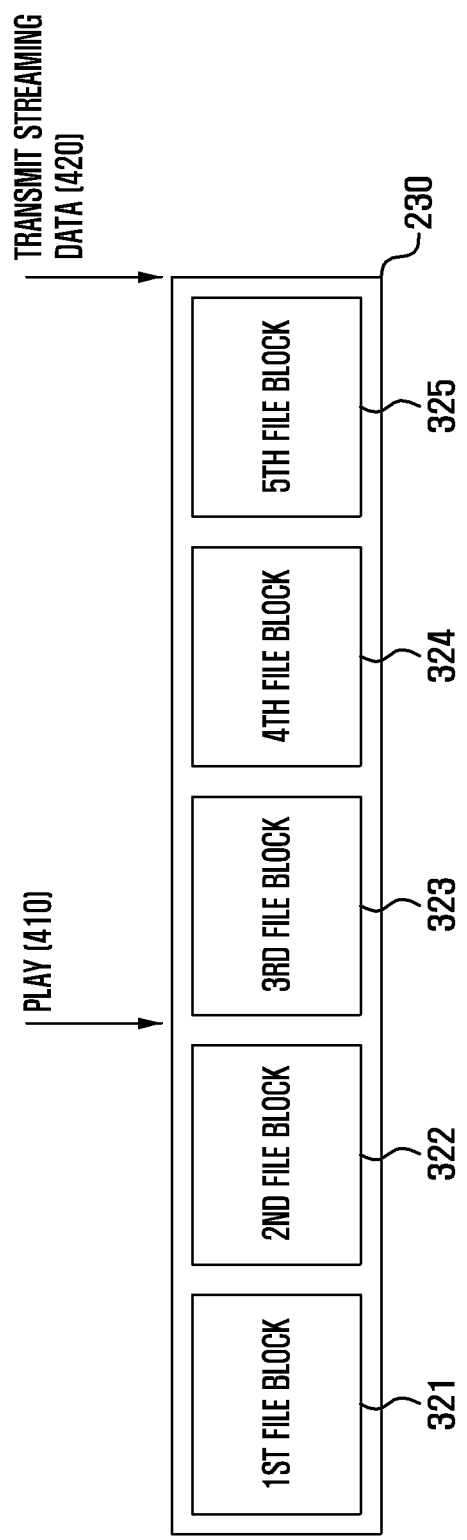
FIG. 4 is a diagram illustrating a streaming data playback operation of a set-top box according to an exemplary embodiment of the present invention.

FIG. 4 is a diagram illustrating a streaming data playback operation of a set-top box according to an exemplary embodiment of the present invention.

Referring to FIG. 4, it is assumed that the number of file blocks to be stored in the playback direction is set to 2. In this case, after the playback of the streaming data contained in the first and second file blocks 321 and 322 stored in storage unit 230, the set-top box 100 starts playback of the streaming data contained in the third file block 323 at the time denoted as denoted by the reference number 410. Although the fourth and fifth file blocks 324 and 325 contain streaming data, the set-top box 100 requests the content server 105 to transmit the streaming data for seamless playback of the content. At this time, the set-top box 100 requests the streaming data corresponding to the file block following the fifth file block 325 as denoted by reference number 420.

Figure 5:
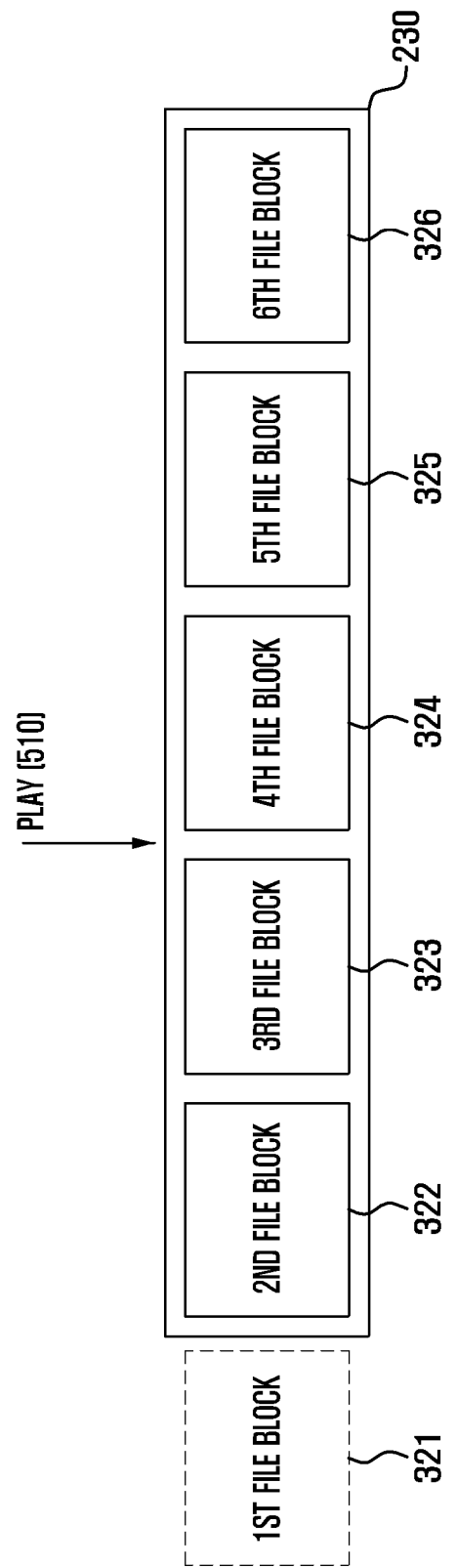
FIG. 5 is a diagram illustrating a file block deletion operation as a consequence of playing back a predetermined number of file blocks in the set-top box according to an exemplary embodiment of the present invention.

FIG. 5 is a diagram illustrating a file block deletion operation as a consequence of playing back a predetermined number of file blocks in a set-top box according to an exemplary embodiment of the present invention.

Referring to FIG. 5, the set-top box 100 deletes the first file block 321 while maintaining the second file block 322 and third file block 323 at the time when the third file block 323 has been played completely. The set-top box 100 stores the fifth file block 325 and sixth file block 326 in the storage unit 230 while playing the fourth file block 324 as denoted by reference number 510. Here, the streaming data of the content received from the content server 105 are stored in the sixth file block 326. The streaming data contained in the sixth file block 326 are the data consecutive to the streaming data contained in the fifth file block 325.

The procedure described with reference to FIGS. 3 to 5 can be summarized as follows. If the streaming data of the content is received through the communication unit 210, the file block configuration unit 220 configures the file block information. Next, the file block configuration unit 220 controls such that the streaming data are stored in the configured file blocks in sequential order.

If the number of file blocks stored in the storage unit 230 becomes equal to a threshold number of file blocks, the file block configuration unit 220 requests the content server 105 to pause the transmission of the streaming data. If the number of stored file blocks has reached the threshold number but no playback command is input, the file block configuration unit 220 requests the content server 105 to pause the transmission of the streaming data. Although the content server 105 pauses transmission of the streaming data, the set-top box can play the streaming data contained in the file blocks stored in the storage unit 230.

While playing the streaming data contained in a file block, the set-top box can delete some of the file blocks. That is, if a number of file blocks of which streaming data have been played is greater than a threshold number of file blocks which is configured to be maintained in the playback direction, the set-top box 100 deletes the file blocks excessive to the threshold number of file blocks. If the content playback stops or completes, the set-top box 100 removes all the file blocks stored in the storage unit 230.

In this manner, the set-top box can buffer the streaming data while playing the content. The set-top box can determine the timing for resuming the download of the streaming data based on the size of the storage space assigned for storing the streaming data.

Figure 6:
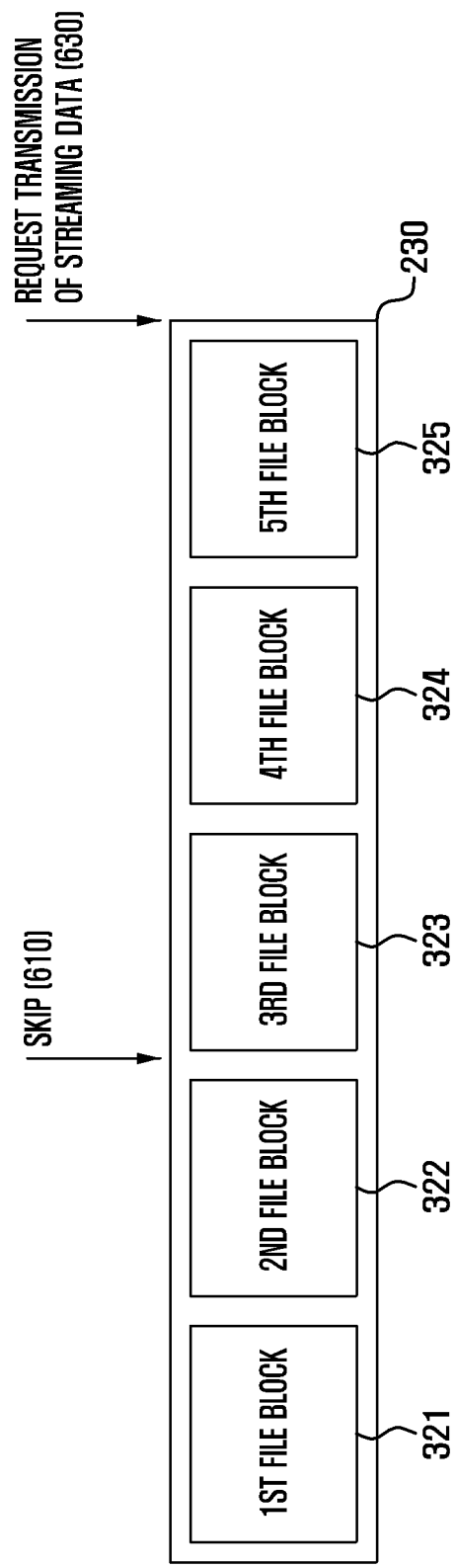
FIG. 6 is a diagram illustrating a playback skip operation of a set-top box according to an exemplary embodiment of the present invention.

FIG. 6 is a diagram illustrating a playback skip operation of a set-top box according to an exemplary embodiment of the present invention.

Referring to FIG. 6, a plurality of file blocks (i.e., the first file block 321, the second file block 322, the third file block 323, the fourth file block 324, the fifth file block 325) are stored in the storage unit 230 of the set-top box 100. For example, after completing playback of the first file block 321 and the second file block 322 and then starting playback of the third file block 323, if a skip command is input by the user at the time as denoted by reference number 610, the set-top box 100 sends a streaming data transmission request for the streaming data following those contained in the fifth file box at the time as denoted by reference number 630. Next, the set-top box 100 deletes the played file block as shown in FIG. 7.

FIG. 7 is a diagram illustrating a file block deletion operation as a consequence of a playback skip operation in a set-top box according to an exemplary embodiment of the present invention.

Referring to FIG. 7, if a playback skip command is input after viewing of the first file block 321 and the second file block 322, the set-top box 100 deletes the first file block 321 and the second file block 322 from the storage unit 230. At this time, the third file block 323, the fourth file block 324, and the fifth file block 325 are maintained in the storage unit 230. The file playback resumes from the fifth file block 325 as denoted by reference number 710, and the sixth file block 326 and seventh file block 327 received from the content server 105 are stored in the storage unit 230.

The procedure described with reference to FIGS. 6 and 7 can be explained in more detail as follows.

If the playback skip command is input in a state when the threshold number of file blocks is stored in the storage unit 230 already, the set-top box 100 determines whether the playback skip occurrence position exists in any of the file blocks stored in the storage unit 230. If the playback skip occurrence position exists in any of the stored file blocks, the set-top box 100 starts playback of the streaming data of the file block having the playback skip occurrence position.

Next, the set-top box transmits the streaming data transmission request to the content server 105 at the time point when the playback skip command is detected. Next, the set-top box 100 plays the streaming data of the file block in the position indicated by the playback skip command.

Although not depicted in drawings, the set-top box 100 can perform storing and deleting of file blocks in association with a multiple speed playback function. If the streaming data of the final file block to be played is reached during the forward multiple speed playback, the set-top box 100 stops the fast forward multiple speed playback. At this time, the file box 100 sends the streaming data transmission request to the content server 105. Next, the set-top box 100 switches to the playback mode to play the streaming data. If enough streaming data is received from the content server 105 and accumulated to reach the amount to be played, the set-top box 100 resumes the multiple speed playback. Also, if the streaming data of the final file block to be played is reached during the multiple speed rewinding, the set-top box 100 stops the multiple speed rewinding. Next, the set-top box 100 starts playing the streaming data of the final file block.

An exemplary content storage process is described in more detail with reference to FIG. 8. The description is directed to a case where the content is played in normal speed.

FIG. 8 is a flowchart illustrating a method for processing streaming data of multimedia content according to an exemplary embodiment of the present invention.

Referring to FIG. 8, the set-top box 100 requests the content server 105 for the content selected by the user in step 810. Next, the set-top box 100 receives the content transmitted by the content server 105 in the streaming data format in step 815. At this time, the set-top box 100 configures file block information for storing the streaming data in step 820. Here, the file block information may include the information set according to the storage space of the storage unit 230 and the total size of the content. The file block information may further include the number of file blocks to be stored in the storage space of the storage unit 230, the size of a file block, and numbers of file blocks to be stored or deleted according to the progress of the content playback.

Next, the set-top box 100 stores the received streaming data in the storage unit 230 in units of file blocks in step 825. While storing the streaming data, the set-top box 100 determines whether the stored streaming data has reached a playable amount in step 830. If it is determined in step 830 that the stored streaming data has reached the playable amount, the set-top box 100 decodes the streaming data to play the content in step 835.

While decoding the streaming data, the set-top box 100 determines whether a number of stored file blocks is equal to a threshold number of storable file blocks in step 840. For example, if the number of storable file blocks is set to 6, the set-top box 100 determines whether the number of stored file blocks has reached 6.

If it is determined in step 840 that the number of stored file blocks is equal to the threshold number of storable file blocks, the set-top box 100 requests the content server to pause transmission of the streaming data in step 845. Next, the set-top box 100 deletes some of the file blocks played already according to the file block information. Assuming that the number of storable file blocks is 10 and the three file blocks before and two file blocks after the ongoing file block are maintained during the file deletion, if the streaming data of the fifth file block is being played and 10 file blocks are stored in the storage unit 230, then the set-top box 100 deletes the file blocks in stored order. That is, the set-top box 100 deletes the first and second file blocks while maintaining the third to tenth file blocks.

Next, the set-top box 100 requests the content server 105 for transmission of the streaming data in step 860. In order to avoid the streaming data received already, the set-top box 100 transmits the information on the streaming data stored right before the transmission of the streaming data transmission pause request. The content server 105 checks the information on streaming data last stored by the set-top box and, as a consequence, transmits the next streaming data. Meanwhile, the set-top box 100 stores the streaming data transmitted by the content server 105 in units of file blocks according to the configured file block information.

While receiving the streaming data, the set-top box 100 determines whether the streaming data of the content has been received completely in step 870. If it is determined in step 870 that the streaming data of the content has been received completely, the set-top box 100 stores and plays the received streaming data in unit of file block in step 880.

As described above, an exemplary streaming data processing method and apparatus of the present invention is capable of processing the streaming data of the content of which size is larger than the available storage space efficiently. Also, an exemplary streaming data processing method and apparatus of the present invention processes the streaming data of the content in units of file blocks, resulting in improvement of storage utilization efficiency. Also, an exemplary streaming data processing method and apparatus of the present invention is capable of reducing total manufacturing cost of the set-top box by reducing costly storage device in size.

While the invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. A data processing method of a set-top box supporting Video On Demand (VOD) service, the method comprising:
   requesting content selected by a user;

configuring, if streaming data of the content is received, file block information for storing the received streaming data based on both storable space of a storage unit and a total size of the content selected by the user; and storing the received streaming data in units of file blocks according to the file block information, wherein the storing of the received streaming data comprises:

determining whether a number of file blocks of the received streaming data is equal to a storable number of file blocks which is set in the file block information based on the storable space of the storage unit;

requesting, if the number of file blocks of the received streaming data is equal to the storable number of file blocks, a pause of transmission of the streaming data; and deleting a predetermined number of file blocks according to the file block information.

2. The method of claim 1, wherein the deleting of the predetermined number of file blocks comprises:

requesting a resuming of transmission of the streaming data; and storing the received streaming data in units of file blocks.

3. The method of claim 2, wherein the requesting of the resuming of transmission of the streaming data comprises transmitting information on the last file block stored before the requested pause.

4. The method of claim 3, wherein the information on the last file block stored before the requested pause comprises at least one of a playback time of the corresponding streaming data and a size of the received streaming data relative to the size of the entire data of the content.

5. The method of claim 1, further comprising:

determining whether a number of file blocks of the received streaming data is equal to a storable number of file blocks which is set in the file block information;

requesting, if the number of file blocks of the received streaming data is equal to the storable number of file blocks, a pause of transmission of the streaming data;

after the requesting of the pause of transmission of the streaming data, determining if a skip command is received; and if it is determined that the skip command is received, requesting a resuming of transmission of the streaming data.

6. The method of claim 5, wherein the requesting of the resuming of transmission of the streaming data comprises transmitting information on the last file block stored before the requested pause.

7. The method of claim 6, wherein the information on the last file block stored before the requested pause comprises at least one of a playback time of the corresponding streaming data and a size of the received streaming data relative to the size of the entire data of the content.

8. The method of claim 1, wherein the file block information comprises a number of storable file blocks constituting the streaming data, a size of a file block, and a number of maintainable file blocks in a playback direction.

9. A data processing method of a set-top box having limited storage space, the method comprising:

configuring, if streaming data of content is received from a content server, file block information for storing the received streaming data based on both storable space of a storage unit and a total size of the content;

storing the received streaming data according to the file block information;

determining whether a number of files corresponding to the received streaming data is equal to a threshold number of storable file blocks which is set in the file block information based on the storable space of the storage unit;

requesting, if the number of files corresponding to the received streaming data is equal to the threshold number of storable file blocks, the content server to pause the transmission of the streaming data;

deleting a predetermined number of file blocks according to the file block information;

requesting the content server to resume transmission of the streaming data; and storing the streaming data transmitted by the content server in units of file blocks.

10. The method of claim 9, wherein the file block information comprises a number of storable file blocks constituting the streaming data, a size of a file block, a number of maintainable file blocks in playback direction that are set in consideration of a size of the content, and the storable space of the storage unit.

11. The method of claim 9, further comprising:

after requesting the pause of transmission of the streaming data, determining if a skip command is received; and if it is determined that the skip command is received, requesting the content server to resume transmission of the streaming data.

12. The method of claim 11, wherein the requesting of the resuming of transmission of the streaming data file comprises transmitting information on the last file block stored before the requested pause.

13. The method of claim 12, wherein the information on the last file block stored before the requested pause comprises at least one of a playback time of the corresponding streaming data and a size of the received streaming data relative to the size of the entire data of the content.

* * * * *